United States Patent [19]
de Freitas

[11] Patent Number: 4,573,613
[45] Date of Patent: Mar. 4, 1986

[54] SEALING AND TOP-DRAINAGE IMPROVEMENT IN MECHANICAL DEVICE TO TRANSFER LIQUIDS FROM CONTAINERS

[75] Inventor: Elias M. de Freitas, Porto Alegre, Brazil

[73] Assignee: Termolar S/A, Porto Alegre, Brazil

[21] Appl. No.: 577,475

[22] Filed: Feb. 6, 1984

Related U.S. Application Data

[63] Continuation-in-part of Ser. No. 342,970, Jan. 26, 1982, Pat. No. 4,506,812, and a continuation-in-part of Ser. No. 342,987, Jan. 26, 1982, Pat. No. 4,440,328, and a continuation-in-part of Ser. No. 339,547, Jan. 15, 1982, Pat. No. 4,429,813.

[51] Int. Cl.[4] ............................................. B65D 37/00
[52] U.S. Cl. ................................... 222/213; 222/385
[58] Field of Search ............ 222/401, 402, 394, 400.7, 222/400.8, 209, 214, 213, 212, 207, 377, 382, 372, 380, 375, 74, 544, 559, 566, 505, 509; 417/472

[56] References Cited

U.S. PATENT DOCUMENTS

| | | | |
|---|---|---|---|
| 1,918,903 | 7/1933 | Fletcher . | |
| 2,514,147 | 7/1950 | Thomas | 62/1 |
| 2,514,773 | 7/1950 | Kromer | 225/1 |
| 2,702,147 | 2/1955 | Brown | 222/213 |
| 2,880,914 | 4/1959 | Lerner et al. | 222/321 |
| 2,893,612 | 7/1959 | Akers | 222/536 |
| 3,152,729 | 10/1964 | Piker | 222/131 |
| 3,905,520 | 9/1975 | Nishioka | 222/209 |
| 4,113,147 | 9/1978 | Frazier et al. | 222/131 |
| 4,116,366 | 9/1978 | Takenakashima | 222/131 |
| 4,125,207 | 11/1978 | Ernst et al. | 222/130 |
| 4,174,053 | 11/1979 | Shimizu | 222/209 |
| 4,238,054 | 12/1980 | Chen | 222/131 |
| 4,274,562 | 6/1981 | Medeiros et al. | 222/401 |
| 4,290,537 | 9/1981 | Chi-Jung | 222/25 |
| 4,300,705 | 11/1981 | Shy | 222/131 |
| 4,310,104 | 1/1982 | Toyobiko | 222/131 |
| 4,320,856 | 3/1982 | Stewart et al. | 222/131 |
| 4,320,859 | 3/1982 | Shy | 222/401 |
| 4,344,548 | 8/1982 | Frazier | 222/209 |

FOREIGN PATENT DOCUMENTS

576978  12/1957  Italy ................................. 222/94 A

Primary Examiner—Joseph J. Rolla
Assistant Examiner—Kenneth Noland
Attorney, Agent, or Firm—Beveridge, DeGrandi & Weilacher

[57] ABSTRACT

Containers, particularly insulated containers are disclosed consisting essentially of a container body filled with a pump mechanism and featuring a flexible bell shaped member, immersed in liquid and equipped with disc valve. This bell shaped member is compressed whenever the actuating button is pressed, thereby forcing the liquid contents of the container to flow out through the pipe up to the pouring spout. A flexible tube is automatically squeezed shut when the bottom returns to its uppermost position.

2 Claims, 7 Drawing Figures

SEALING AND TOP-DRAINAGE IMPROVEMENT IN MECHANICAL DEVICE TO TRANSFER LIQUIDS FROM CONTAINERS

REFERENCE TO THE RELATED APPLICATION

This application is a continuation-in-part of my co-pending application Ser. Nos. 342,970 now U.S. Pat. No. 4,506,812 and Ser. No. 342,987 now U.S. Pat. No. 4,440,328 both filed Jan. 26, 1982 and Ser. No. 339,547 now U.S. Pat. No. 4,429,813 filed Jan. 15, 1982, all of which are relied on and incorporated by reference.

The present invention relates to improvements introduced in the sealing system of mechanical devices for transferring liquids from containers, especially from isothermal containers, however with no restrictions towards its use in other types of containers. More specifically, it relates to an improvement introduced in a device which was the object of the application for patent Ser. No. 339,547 filed Jan. 15, 1982, by this applicant. Drainage of the top itself has been further improved by raising the level of the openings, thereby precluding self-pumping.

An essential feature of these containers resides in an immersed pump adapted to the containers and which enables the transfer of liquids contained therein without the need of inclining them by mechanical manual action.

Devices with the same purpose have been used for some time in thermos jugs (vacuum flasks) of Japanese, Chinese (Taiwan) and American manufacture. In all these jugs the same basic working principle is used; namely, the introduction of a certain volume of air into a sealed container for containing liquids which, by the increase of the internal pressure, causes the outflow of a corresponding volume of this liquid, through a pipe inserted therein and communicating with the outside. For this reason, these thermos jugs with pumps are called "air pots".

These devices, located in the mouth of the container, consist essentially of flexible - body pumps which can be of the "bellows" or "invagination" types (with cylindrical stretchable walls that distort themselves interpenetrating one to another).

As examples of the "bellows" type, the following models are noted: Thermos' 2647 BARTENDER and 7771/P "JETJUG", Japanese ZOJIRUSSHI VACCUM BOTTLE BO. LTP and AIR-POT-Hsin MAIN-TAIPEI from Taiwan. As examples of the second type, the following models are noted: Alladin's PUMP-A-DRINK JUG No. 575 and No. 585, as well as the SERVE-A-JATO, made in Brazil, where there is also a practically identical version, Invicta's PRESSO-SERV and finally Thermos' model—2645 TOUCH-TOP.

In these various models or devices that permit the pumping of selected amounts of liquids by air compression, there are a series of auxiliary mechanical elements such as valves etc., to improve their functioning. In some cases such as Alladin's models No. 575, No. 585, Serve-a-jato and Invicta's PRESSO-SERV, the admission valve is replaced by the action of a finger which closes the air inlet in the moment of pressing the pump.

Although all the pumps mentioned are rather efficient, they present two great disadvantages, as follows:

1. For practical reasons, because the air volume injected is relatively small, the volume of the containers cannot exceed certain limits, otherwise part of its contents could not be pumped.

In large containers, the relation between the air volume and the volume of the liquid container inside the container is such that each individual pumping does not cause a sufficient increase in pressure to exceed the manometrical pressure related to the height of the outflow pipe. In order to obtain sufficient pressure, it is necessary to pump several times, which in turn, requires valves that prevent return of air, thereby making necessary a means to voluntarily interrupt the flow of liquid when the desired quantity is obtained, otherwise the liquid would go on flowing out of control. These factors therefore unduly complicate a mechanism, the main advantage of which is intended to reside in the basic simplicity of use—one pumping—one selected amount of liquid.

2. The second disadvantage resides in the fact that the containers must be tall and of small cross-section, because for a given volume, the evaporation surface must be small to avoid self-pumping.

The self-pumping effect has forced Alladin to warn against the use of hot liquids in its model PUMP-A-DRINK GALLON JUG—ref. 585.

Another problem with the above described containers is that the communication of the liquid with the outside remains constantly open through the outflow pipe.

This is extremely inconvenient in dusty environments or where insects are present which are attracted by sweet drinks and will invade the spout and the outflow pipe.

There are some models that in order to avoid the mentioned inconvenience, have small rubber stoppers for closing the pouring spout. The problem with this solution is that if the stopper is left in the spout when pumping, it could cause a real explosion of hot liquid.

Only Thermos' model 2645 TOUCH-TOP was designed with a "drawer spout" which simultaneously closes the outflow orifice and locks the pump when pushed in. When the "drawer spout" is pulled out, it unlocks the pump and allows serving.

Several models from Japan and Taiwan are provided with some kind of lock to prevent accidental pumping.

Another inconvenience of the mentioned pumps is the need to provide good sealing between the lid and the containers, because if there is an escape of pumped air, the liquid will not flow out.

In my aforementioned application Ser. No. 339,547, there is described a device provided with a pouring spout which is positioned, under pressure, against a hemispherical hump for purposes of sealing. Although working properly, the problem exists that the small amounts of liquid which remain wetting the inner walls of the spout can trickle down towards the hump, thereby smearing it. Moreover, after each pumping action, a noise can be noted, caused by air entry through the pouring spout, which further accelerated the thermal exchange between the liquid contents and the atmosphere.

It is therefore the purpose of the present invention to eliminate those inconveniences and problems, and to provide modifications at the pouring spout connection, in particular, the removal of the hemispherical hump.

In general, the device of this invention features a pump as shown in my earlier application Ser. No. 339,547 which operates on a principle totally different from the prior art since it does not depend on the compression of air into containers and therefore does not require airtight sealing.

It is a feature of this invention that the device is formed by an upper body and by a pump, which is located in the bottom of the container, both parts being linked by a vertical transference pipe.

The upper (or inner) body can, through its connection ring, be fixed in an outer container by a system of screw threads, by a "bayonet" joint or simply fitted in under pressure. In between the outer and inner container is insulation material such as foamed plastic or the like.

Just above the connection ring, there is an external rotating cover, guided by the lower edge border, in the reentrance formed between the prominent edge and a "bearing-cover". The rotating cover is provided with a side protuberant portion forming a pouring spout. This spout, together with the cover, can easily be turned to the rear of the container where it is positioned over a matching elevated section of the outside shell of the container. The spout when turned to the rear rests over the elevated section of the outside shell of the container but need not be in contact therewith. It is sufficient if there is a minimum space therebetween to form a snug fit.

When the spout is turned to the pouring position and the activating button is pressed, the latter, through the movable coupling of the transference pipe and the corresponding activating flange, compresses and distorts a flexible bell shaped cover attached to it, which is immersed in the liquid. The liquid contained in the ball shaped cover cannot flow out by the lower opening obstructed by a disc valve which is forced against the ring-like border of the lower edge of the valve housing in the bell shaped cover by the pressure of the liquid.

For this reason, the liquid, being incompressible, is expelled from the bell shaped cover through the transference pipe, the movable coupling and the flexible pipe, flowing out through the pouring spout.

In the above mentioned device, the outflow of the liquid occurs freely, and its flux depends exclusively on the manner in which the activating button is pressed, therefore the flux does not depend on the level of the liquid; even in a large volume container it being always possible to pump all of the contents.

The pipe which connects the movable coupling to the pouring spout is flexible in order not to transmit the up and down movement from the movable coupling to the pouring spout which remains fixed. This disposition also allows a minimum opening of all the elements of the pump. The movements of the movable coupling and of the transference pipe are guided by a cylinder that moves up and down the "bearing-cover" and is called the "guide-pipe" of the cover. Internally of the container cover, there is a mechanism for squeezing shut the flexible pipe when the activating button is at rest.

When the manual pressure on the activating button ceases, it goes up together with the movable coupling, due to the reaction of the spring, compressed in the pumping action.

This in turn forces the transference pipe and the corresponding activating flange to move up, letting go the flexible bell shaped cover which returns to its original shape, aspirating the liquid through the wide ring-like opening of its lower part, where there is the disc-valve, which is lifted by the difference of pressure between its outer and inner faces.

The disc-valve has its upward movement limited by the protuberances located in the internal part of the upper edge of its housing in the flexible bell shaped member.

Therefore, when the pressure on the activating button ceases, the flexible bell shaped member is immediately filled with liquid, making the system ready to be activated again. In the lower lateral wall of the "bearing-cover", there are small vertical lateral slits that allow entry of necessary air for the substitution of the volume of liquid already pumped from the container.

These vertical lateral slits are introduced in the lower lateral wall of the bearing-top, with elimination of the bottom holes, for if the user should fill the container past the level of the bottom holes, an airtight chamber would be thus formed above the water level, which would cause self-pumping upon transporting gaseous or very hot beverages. With the modification indicated this drawback disappears, for the slits are placed high enough, almost at the level of the container mouth.

As described in my copending applications, one extremely important characteristic of this pump is to be totally immune to problems of air escape in the container, for its functioning does not depend on the increase of the inner pressure, but only on the compression of the charge of liquid contained in the flexible bell shaped member.

The novel feature of this invention resides in the closing of the pouring spout by means of an internal device which squeezes the flexible tube closed in the order to control the flow of liquid. A simple turn of the pouring spout to a position opposite to the "serve" position will move the pouring spout out of the way. Also another advantage of the new system is the elimination of valves in the upper body, and the elimination of holes in the pump lid which would have to be closed with fingers in the act of pumping. This hole, in the models that require it is an additional entrance point for impurities in the pump.

As a result of the design of the pump, the use thereof is extremely easy for the consumer: pouring spout to the front and depress the button to serve; release button to close spout, turn spout to the rear to get the spout secured and out of the way.

Turning the pouring spout to the rear has the advantage of protecting the pouring spout, preventing it from protruding during transportation, and preventing accidential depressing of the button. When the handle of the container is raised, it prevents the pouring spout to be turned 180° to the operational position.

To this is added the facility of disassembling and the extreme ease by which all the components in touch with the liquid may be reached, making them easy to be completely cleaned.

The objectives, advantages and innovations of this invention become evident from the following description of a preferred mode of the invention, when considered in connection with the drawings in which.

Figure 1:
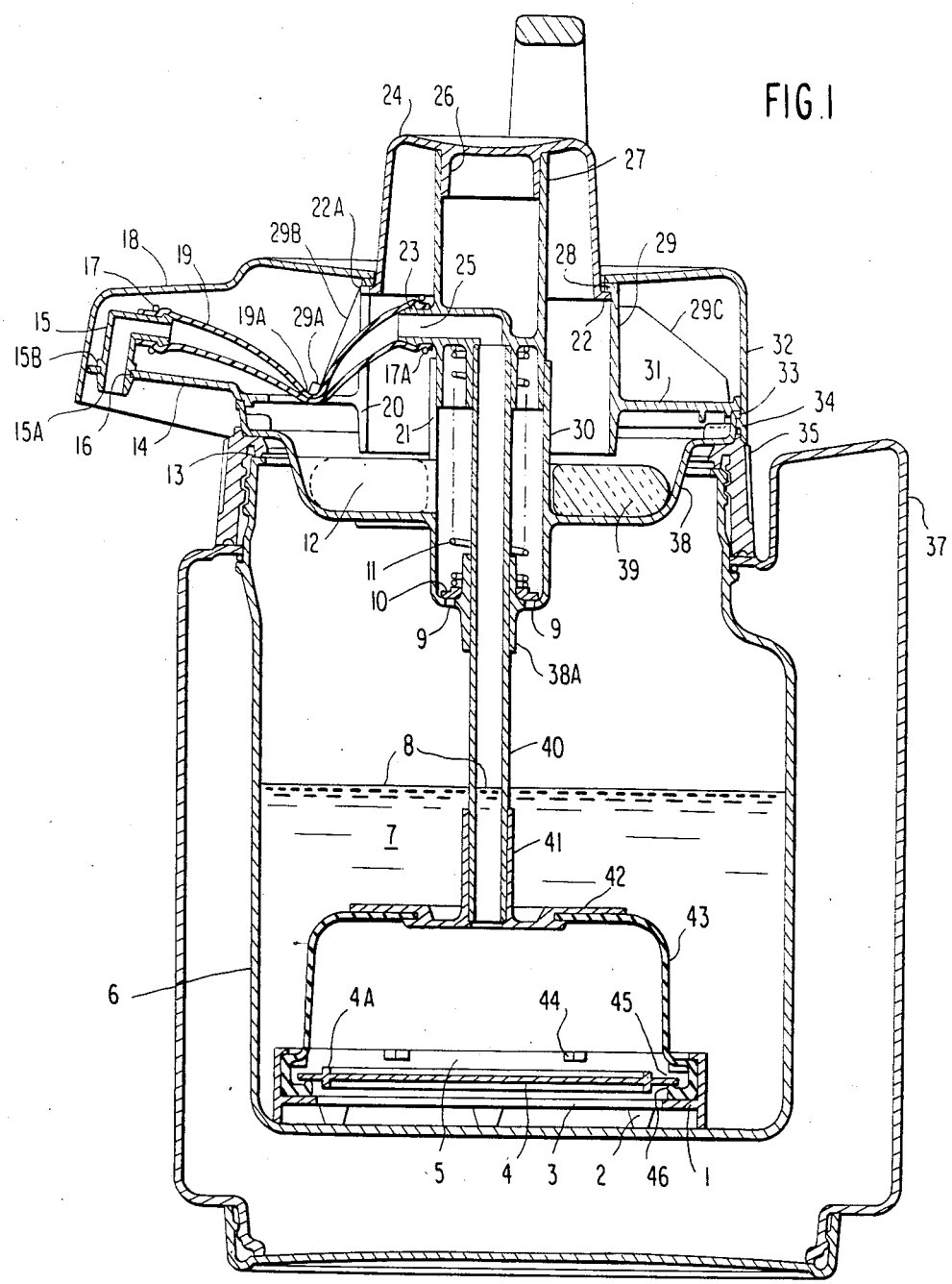
FIG. 1 is a side view in cross-section, with the pump-activating button at its inoperative position.
Figure 1A:
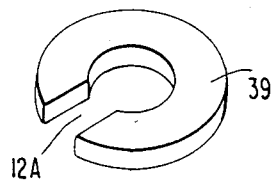
FIG. 1a is an isometric view of the thermal insulation plate and FIG. 1b is a view taken through section AA.
Figure 1B:
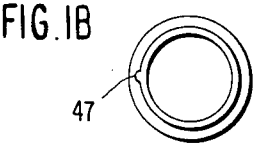
Figure 2:
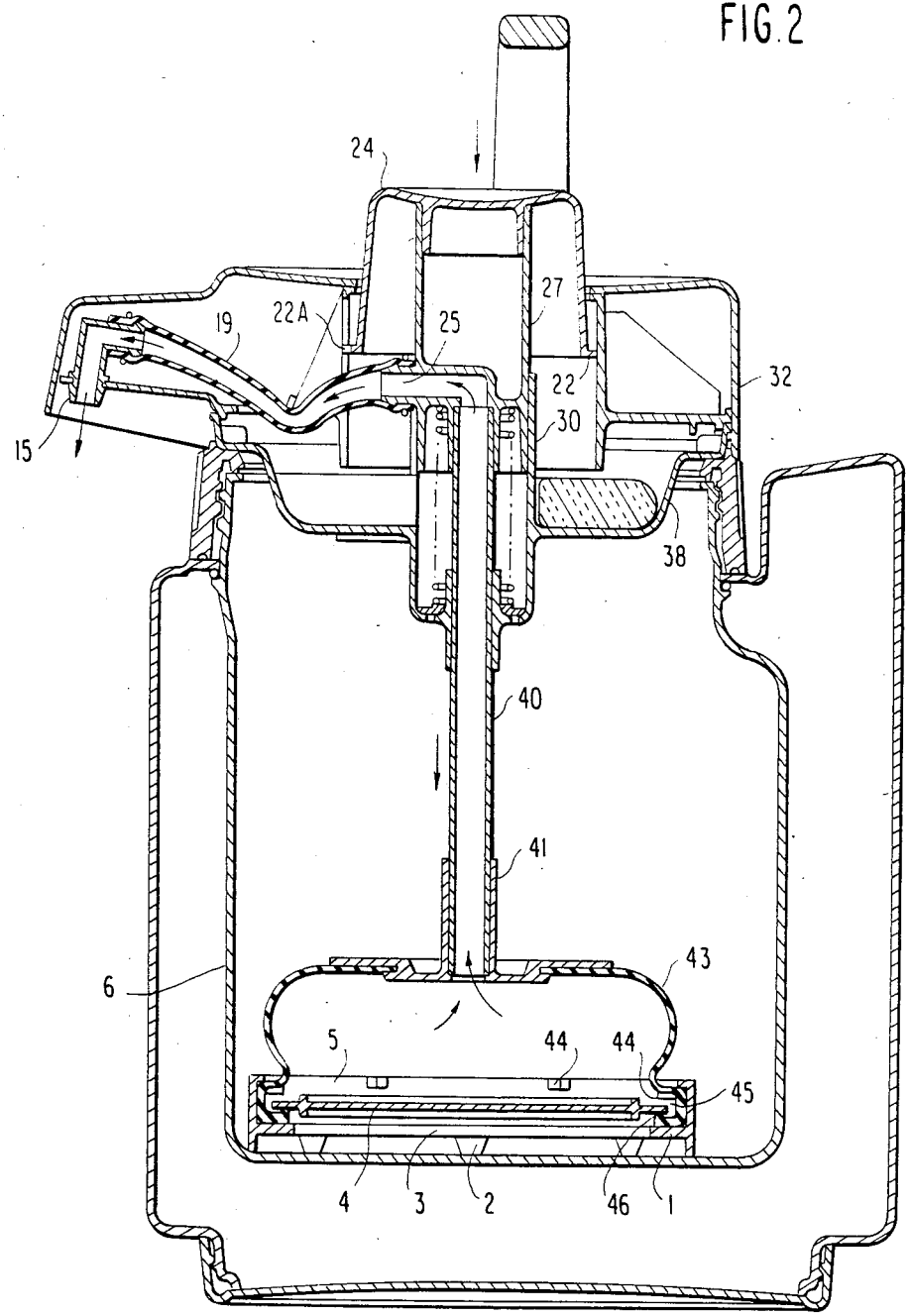
FIG. 2 is a side view in cross-section, with the pump-activating button being depressed.

The pump consists essentially of a flexible bell shaped member (43), a disc-valve (4) provided with reinforcements (4A), a transference pipe (40), a movable coupling (27), a flexible pipe (19), a pouring spout (15) and an actuating button (24). There is also a guide coupling (29) of the button, an external rotating cover (32) with a beak-like side protuberance (18), a return spring (11), a sliding washer (10), a threaded connection ring (35) and the corresponding sealing ring (13).

It also has an activating flange (41) inserted in the bell shaped member (43), attached to it by the panel or border (42) and a reinforcement ring (1) set in the lower edge of the bell shaped member. To explain the functioning of the pump, it is illustrated in relation to an inner container (6) fitted into an outer container (37). The bottom of the container (37) may be solid or fitted with a bottom panel, as shown, which may be attached to the container by a threaded connection or a bayonet mount.

In the flange (22) of its lower edge, the actuating button (24) has a projection (22A) which fits in the vertical groove (20) of the guide coupling (29) of the button (24). The groove (20) of the guide coupling (29) can also allow the passage of the flexible pipe (19). The cylindrical part of the piece (29) is provided, in the lower third of its height, with a circular disc-like plate (31) which has an extension (14) with an orifice (16) where the pouring spout (15) is adapted. The guide coupling (29) also has a re-entrant edge (28) in its upper part, which limits the upward movement of the actuating button (24) through its flange (22). The actuating button (24) is adapted to the movable coupling (27) through the casing or cylindrical projection (26) both becoming unitary in rotation movements through the fitting (47). The guide pipe (30) of the bearing cover (38) has a groove (21) which allows the free downward displacement of the tip (23) which attaches the flexible pipe (19) to the movable coupling (27), the bearing-cover (38) with its guide-pipe (30) is linked, by welding or any other method, to the threaded connection ring (35) thus forming the lowering or ring-like groove (33) where the rim (34) of the external rotating cover is housed. The flexible pipe (19) is secured at either end by rings or clamps (17) and (17A).

In the bottom of the bearing-cover (38) there are two vertical partitions (12) that put into place a thermal insulation plate (39) through its groove (12A). In the bottom of the guide-pipe (30) there are small holes (9) that equalize the internal and the atmospheric pressure.

As the external cover (32) is turned, the extension (14) of the circular plate (31) of the guide coupling (29) of the button also turns together with the pouring spout (15) and the flexible pipe (19). The actuating button (24), clamped in the groove (20) makes the movable coupling (27) rotate, so that the tip (23) is no longer aligned with the groove (21) of the guide (30) of the bearing cover (38) which, remaining stationary, prevents the downward movement of the set. That is, the combination of the actuating button (24), movable coupling (27), transference pipe (40) and corresponding activating flange, will not then be able to press down the flexible bell shaped member (43) and the pump remains locked. Turning the pouring spout 180° to the front of the container so that the tip (23) coincides with the groove (21) of the guide (30), unlocks the pump making it ready to operate.

As can be seen in the drawings, the mechanical device for transferring liquids from containers has featured modifications in its upper part, which serves as a top, houses the activating button and projects the pouring spout.

In order to assure sealing of the pouring spout (15) when the button 24 is in the uppermost position, the interior of the rotating cover (32) is arranged to provide a small cross-bar (29A) normal to the two side planes of the pouring spout projection and essentially parallel to the horizontal surfaces.

Connecting the pouring spout (15) inner surface with the "L"-pipe (25) there is length of flexible tube (19) made of synthetic elastomer, which is not subject to a permanent deformation, and runs between the surfaces of the cover and under the cross-bar (29A).

Considering the location of the pouring-spout (15) and the "L"-pipe (25), one can see that, at the inoperative position, i.e., when the activating button is not being depressed (FIG. 1), the flexible tube runs under the cross-bar (29A) and becomes folded, its walls being deformed, inner surface of the walls of said tube being pressed together and thereby providing effective sealing, even when not in a locked position.

When the top is rotated to the closed position, the mechanism locks the activating button, and there is no possibility of leakage. The pump working system is described as follows:

The liquid (7), being in a level (8) and contained in the container (6), fills the flexible bell shaped member (43) and the transference pipe (40) to the level (8) by the communicating vessels principle.

Pressing the actuating button (24), the movable coupling (27) slides downward guided by the central pipe (30) of the bearing cover (38). When the movable coupling (27) goes down, it will, through the transference pipe (4) and the corresponding activating flange (41) compress the flexible bell shaped member (43) distorting it against the reinforcement ring (1) which is supported by the prominences (2) in the bottom of the recipient (6).

With the distortion of the bell shaped member, the pressure of the liquid in it increases, forcing the disc valve (4) to rest against the rim (46) of the lower edge of its housing, making the liquid flow out through the transference pipe (40) passing through the "L" pipe (25) of the movable coupling (27) and through the flexible pipe (19) finally flowing out through the pouring spout (15). Releasing the actuating button (24), the return spring (11) causes, through the movable coupling (27), the return of the button (24) and of the transference pipe (40) to the initial position, allowing the bell shaped member to return to its original shape.

In this process, the liquid enters the bell shaped member through the lower opening (3) of the reinforcement ring (1), lifting the disc-valve (4), passing through the space between the latter and the side walls of its housing (45) in the flexible bell shaped member (43). The disc-valve (4) while going up, rests against the prominences (44) of the upper edge of its housing (45) in the flexible bell shaped member (43). These prominences produce ring-like fissures or windows (5) that allow the inflow of the liquid in the flexible bell shaped member (43) as shown by the flux indicating arrow. With this, the flexible bell shaped member (43) is filled again, making the set ready to a new pumping.

The small orifices (9) allow the inlet of the external air necessary to replace the volume of the pumped liquid. On the other hand, the position of these orifices in the bottom of the guide pipe (30), prevents the leaking of the liquid, even with sudden movements of the container.

Outside the pump, there is an outside container (37), provided with an extended section corresponding to the closed position of the pump; i.e. when the pouring spout (15) is turned to the rear the spout (15) is positioned over the extended section of the outside container (37).

Figure 3:
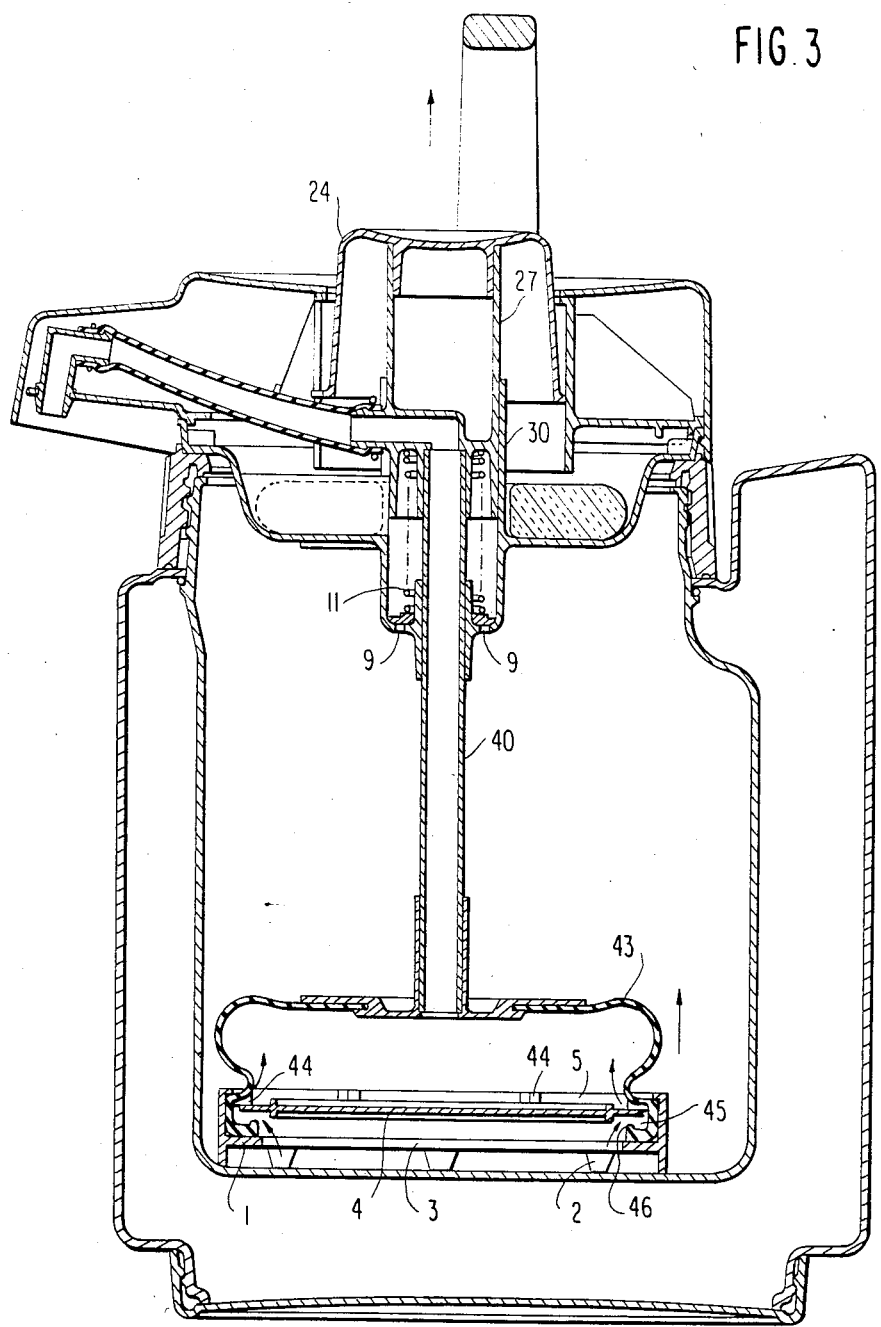
FIG. 3 is a side view in cross-section, with the pump-activating button released, returning to its inoperative position.
Figure 4:
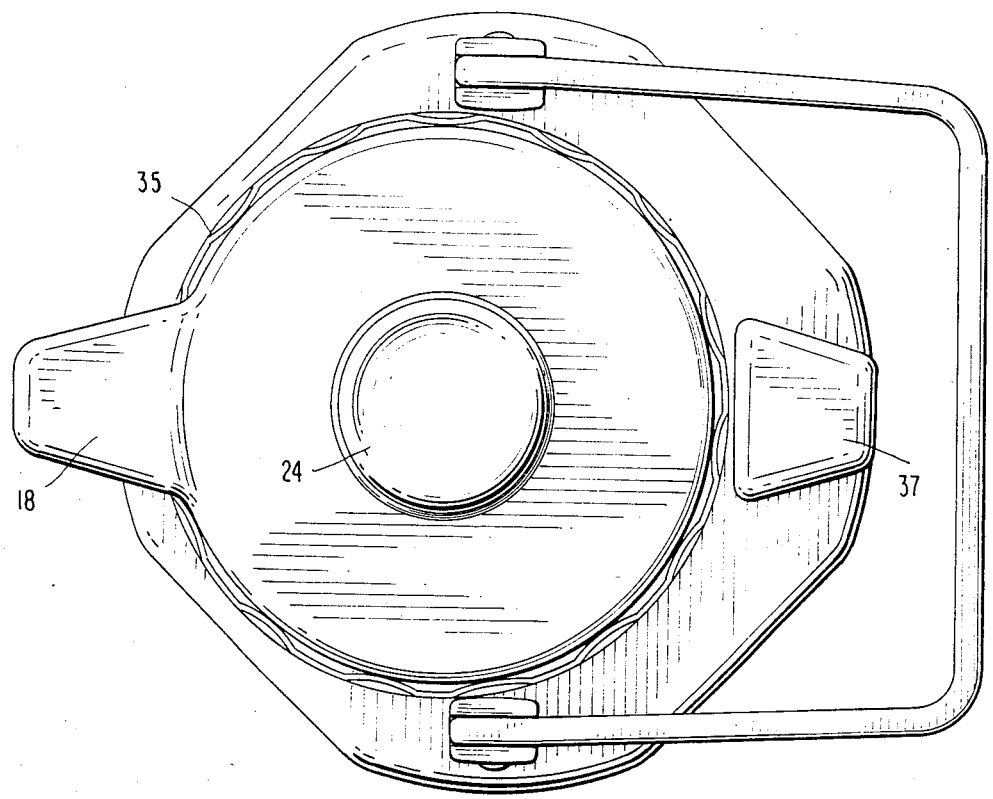
FIG. 4 is a top view.
Figure 5:
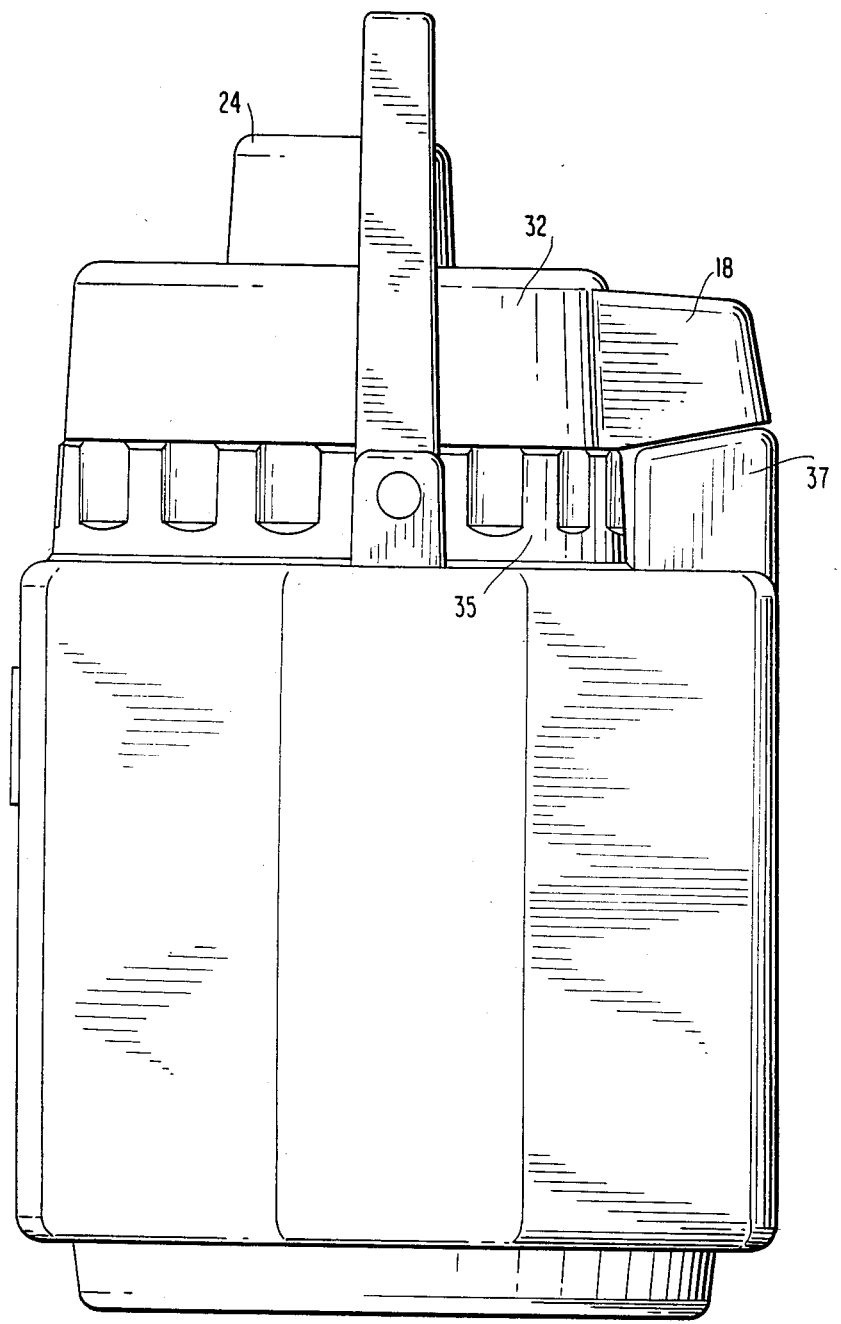
FIG. 5 is a side view of the container of the invention.

In actual operation, when the activating button (24) is pushed, the "L"-pipe (25) starts descending at the same time as the transfer device, thus reducing the squeezing of the flexible tube (19) by the cross-bar (29A). The "L"-pipe and the pouring spout become aligned in the lower position of the activating button, at which time this flexible tube becomes practically straight. See FIG. 3.

After removing pressure from the activating button (24), the latter returns to its inoperative position, once again folding the flexible tube (19) against the cross-bar (29A) and sealing the container. The spout (15) is connected to flexible tube (19) by a clamping ring (17). At the other end of spout (15), a ridge or flange (15B) insures that the spout is locked into the opening (15A) of member (14). In this way, the spout will not move up into the chamber inside the cover (32) because its movement is limited by the nesting of the flange (15B) against the opening (15A) in the trapezoidal projection (14) of the plate (31).

When pouring spout is turned 180° to the rear, it is then perfectly sealed and a small effort allows its disengaging and its rotation to the pouring position.

Thus, according to the invention, the mechanical device to transfer liquids from containers, when fitted into a container, does not require its inclination, and does not depend on its air tightness and volume, and features a pump including a flexible bell shaped member (43), with an upper orifice, and a widened ring-like area in its lower extremity, forming a housing (45) where a rigid veined disc is located forming a disc-valve (4), said housing being provided, in its upper internal edge, with small prominences (44) and the lower edge, which limits the opening of the mouth of the bell shaped member, and ends in a small inner vertical projection forming a continuous rim (46); a liquids transference pipe (40) connected to the upper orifice of the bell shaped member, and when a vertical manual compression effort is made, the bell shaped member is deformed, compressing the liquid inside it, thereby pressing the disc-valve (4) against the continuous rim (46) of the housing (45), thereby sealing the mouth of the bell shaped member and forcing the liquid to flow out through the transference pipe (40); and the prominences (44) of the housing limit the upward movement of the disc-valve, leaving an empty space for the inflow of the liquid in the bell shaped member (43) when it returns to its original shape. The liquids transference pipe is ultimately connected at its upper end to conveying means which in turn are connected to the pouring spout. Included in the conveying means is a flexible tubing which, upon vertical movement of the accuating button is squeezed closed and permitted to open when the button is depressed.

A coupling between the bell shaped member and the vertical transference pipe (40) is made by means of an activating flange (41) with a disc shape having in its upper face a pipe-like prolongation, into which is tightly introduced the vertical transference pipe (40), and the lower face of which rests on and is fixed by a rim (42) to the upper part of the bell shaped member.

The bell shaped member is externally surrounded, at its widened ring-like region, by a cylindrical reinforcement ring (1), which has small feet like prominences (2) in its lower part, which permit the pump to rest in the bottom of the container, leaving gaps for the liquid inflow; said cylindrical ring having a planar lower edge, which gives a uniform support to the mouth of flexible bell shaped member (43); the reinforcement ring (1), when removed, allows the withdrawing of the disc valve (4), due to the elasticity of the bell shaped member, thus permitting the easy cleaning of the pump.

An upper body is attached to said pump through the upper extremity of the vertical transference and activation pipe (40). The body has a connection ring (35) which allows the fixation of the pump and upper body set to a container (6); which is made through releasible fitting such as a screw thread, bayonet joints, or the like and maintains a correspondence that always insures the same relative position of the parts and whose sealing is done by a sealing ring (13).

The upper body, has fixed permanently to the connection ring (35), a bearing cover (38) whose plane bottom is crossed centrally by a vertical cylindrical pipe (30) which serves as a guide for the up and down movements of the movable parts of the pump, said pipe having in its lower extremity, a diameter reduction (38A), through which passes the transference and activating vertical pipe (40), said cylindrical pipe (30) having in the part above the surface of the bottom of the bearing cover a vertical groove (21) which permits and guides the upward and downard movements of the movable elements of said set, which further includes an actuating button (24), and lodges a helicoidal spring (11) which causes the return of the actuating button (24) and other movable parts related to it, back to the initial position. The spring (11) is supported through a ring (10), on the step formed by the reduction (38A) of the diameter of the cylindrical pipe (30) there being at least one orifice (9) in order to equalize the container internal pressure with atmospheric pressure, said bearing cover (38) having two vertical partition (12) housing on its flat bottom an insulating plate (39) in the shape of a disc opened by a slot (12A) intended for positioning it in relation to the bearing cover through said two vertical partitions (12).

The upper body further includes a set of movable operation elements including an actuating button (24) and a cylindrical tube forming a movable coupling (27) centered in relation to the bearing cover (38). The cylinrical tube is equipped with, in its inner part, a horizontal wall which divides it internally into two parts, upper and lower and an "L"-shaped pipe (25) placed directly above the dividing wall, its horizontal branch forming a tip (23) which projects itself beyond the cylinder wall, at such a point that when cylindrical pipe of the movable coupling (27) is fitted to the actuating button (24), the tip (23) is located right below the lower edge of the button (24); the vertical branch of the "L"-shaped pipe (25) projecting downwardly through the dividing wall concentrically with the cylinder and having an inner diameter equal to the outer diameter of the transferring vertical pipe (40) into which it is fitted, the lower part of the dividing wall and the cylinder itself providing a housing for the upper helicoidal spring (11).

The actuating button (24) comprises a body in the shape of an upside down cup, finished on its lower end by a prominent continuous edge, forming a flange (22), and equipped with a small tooth-like projection (22A); said button presenting in its inner part, a projection or cylindrical skirt (26) into which the upper end part of the movable coupling (27) of the cylindrical tube is fitted.

The coupling (27) has a vertical slot (47) and said cylindrical skirt (26) has a vertical rib fitted to the corresponding slot (47) of the movable coupling pipe (27) connecting both parts in relation to the rotating movements, whereby tip (23) of the "L"-shaped pipe (25) of the coupling remains always aligned with the small tooth-like projection (22A) of the actuating button (24) edge.

The set of movable elements are put into place through the use of a guide-coupling part (29), formed by a circular plate (31) with lower rim to which the bearing cover (38) is adapted, and which can turn freely in relation to it, said circular plate (31) having a trapezoidal projection (14) defining a spout, said plate (31) having a cylindrical projection on its central part, which extends itself up and down from the plate, and a vertical slot (20), extending up and down from the circular plate (31), and having on its upper end a reentering edge (28) which, being continuous, limits on the upper part said vertical slot (20), forming a stroke-ending arrestment for the upward movement of the actuating button (24) through the lower flange (22), said circular plate (31) having, aligned with the slot (20) of its central cylindrical pipe, a slot in the direction of its trapezoidal projection, allowing the downward movement of the activating button, when it is aligned with the slot (21) of the cylinder (30) of the bearing cover (38), and permitting the downward movement of the actuating button (24), the trapezoidal projection (14) of the plate (31) having an orifice (16), into which is introduced the vertical branch of the "L"-shaped pouring spout (15), being its horizontal branch facing the center of the circular plate (31), said horizontal branch of said spout is connected, by means of a flexible pipe (19) to the tip (23) of the "L"-shaped pipe (25) of the movable coupling cylinder (27), passing through the slot (20) of the cylinder of the guide-coupling piece (29).

The guide coupling part (29) is fitted to the bearing cover (38), so as to enable a relative turn between them limited to 180°, as permitted by a stop on the lower face of the circular plate (31) of the guide-coupling part (29) and two diametrically opposed stop ribs on the bearing cover (38), said 180° turn occurs between the position of liberation of up and down movement of the actuating button (24) and the locking position, the locking being achieved turning the guide-coupling part (29) when the tip (23) of the "L"-shaped pipe of the movable coupling (27) is out of line in relation to the vertical slot (21) of the cylinder (30) of the bearing cover (38).

The upper body is equipped with a turning cover (32) cylindrical in shape, with a spout cover (18) in the shape of a hollow truncated pyramid covering the trapezoidal projection (14) of the guide-coupling part (29), said cover open on its lower part, is defined at the top by a level surface which has an orifice allowing the passage of the actuating button (24), said surface serving as an upper arrestment of the guide-coupling part (29), whose lower arrestment is the bearing cover (38), first through the reentring upper edge (28) of the central cylinder and then the circular plate (31) of the guide-coupling part, said rotating cover (32) is in turn fitted by its rim (34) to a ring-like groove (33), formed by the upper edge of the bearing cover (38) and by the threaded connection (35) so as to allow the cover to turn.

When the trapezoidal projection (14) of the guide-coupling part (29) fitted internally in the spout cover (18) of the turning cover (32) is rotated its rotating movements are transmitted to the guide-coupling, thus alternately freeing or locking the actuating button (24).

The principle features of the invention thus resides in the sealing and top-drainage improvement of mechanical devices to transfer liquids from containers, whereupon, instead of performing pouring spout sealing, with the container closed by means of a hemispherical hump, a flexible tube is used which is squeezed closed. When the activating button is at its upper inoperative position, the device has a cross-bar positioned across the two vertical parallel sidings, under which the cross-bar squeezed the flexible tube (19) closed. In the closed position the tube (19) is folded and pressed against said cross-bar and is effectively sealed. Vertical lateral drain slits are placed on the lower lateral wall of the bearing-top. The extension of the outer container features a flat upper face which corresponds to the pouring spout in its locked position.

It should be understood that the parts described here were intended only to serve as examples, their shapes, materials, and dimensions can be changed without deviating from the basic concept of the present invention. This is partly determined by the shape of the thermal container to be used. Variations and modifications of the foregoing as will be apparent to those skilled in the art are intended to be encompassed by the claims appended hereto.

I claim:

1. A mechanical device to transfer liquids from containers which, when fitted into a container, does not require its inclination, and does not depend on its air tightness and volume, comprising a pump including a flexible bell shaped member (43), with an upper orifice, and a widened ring-like area in its lower extremity, forming a housing (45) where a rigid veined disc is located forming a disc-valve (4), said housing being provided, in its upper internal edge, with small prominences (44) and the lower edge, which limits the opening of the mouth of the bell shaped member, and ends in a small inner vertical projection forming a continuous rim (46); a liquids transference pipe (40) connected to the upper orifice of the bell shaped member, and when a vertical manual compression effort is made, the bell shaped member is deformed, compressing the liquid inside it, thereby pressing the disc-valve (4) against the continuous rim (46) of the housing (45), thereby sealing of the mouth of the bell shaped member and forcing the liquid to flow out through the transference pipe (40); the prominences (44) of the housing limiting the upward movement of the disc-valve, leaving an empty space for the inflow of the liquid in the bell shaped member (43) when it returns to its original shape, the liquids transference pipe being further connected at its upper end to conveying means which in turn are connected to spout means, said conveying means including a flexible tubing, said mechanical device further having a rotatable cover with an interior space thereof for accommodating said flexible tubing and being provided with squeezing means for closing said flexible tubing, the squeezing of the flexible tubing obtained by vertical displacement of tubing.

2. A vacuum flask or foam insulated container equipped with the pump device of claim 1.

* * * * *